(12) United States Patent
Arwatz et al.

(10) Patent No.: US 8,550,120 B2
(45) Date of Patent: Oct. 8, 2013

(54) APPARATUS AND METHOD FOR OSCILLATING FLUID JETS

(75) Inventors: Gilad Arwatz, Tel-Aviv (IL); Ilan Fono, Herzlia (IL); Avraham Seifert, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 786 days.

(21) Appl. No.: 12/598,444

(22) PCT Filed: Apr. 27, 2008

(86) PCT No.: PCT/IL2008/000541
§ 371 (c)(1),
(2), (4) Date: Apr. 14, 2010

(87) PCT Pub. No.: WO2008/135967
PCT Pub. Date: Nov. 13, 2008

(65) Prior Publication Data
US 2010/0193035 A1    Aug. 5, 2010

Related U.S. Application Data

(60) Provisional application No. 60/924,157, filed on May 2, 2007, provisional application No. 60/924,158, filed on May 2, 2007.

(51) Int. Cl.
*F15C 1/08*    (2006.01)
(52) U.S. Cl.
USPC ........................................ 137/837; 137/835

(58) Field of Classification Search
USPC .................................................. 137/834–837
See application file for complete search history.

(56) References Cited

U.S. PATENT DOCUMENTS

| 3,016,066 | A |   | 1/1962  | Warren               |
|-----------|---|---|---------|----------------------|
| 3,093,306 | A | * | 6/1963  | Warren ...... 235/201 PF |
| 3,098,504 | A |   | 7/1963  | Joesting             |
| 3,124,999 | A |   | 3/1964  | Woodward             |
| 3,158,166 | A | * | 11/1964 | Warren ........ 137/835 |
| 3,238,958 | A |   | 3/1966  | Warren et al.        |
| 3,266,510 | A |   | 8/1966  | Wadey                |
| 3,357,441 | A |   | 12/1967 | Adams                |
| 3,371,675 | A | * | 3/1968  | Hatch, Jr. ........ 137/835 |
| 3,504,691 | A | * | 4/1970  | Campagnuolo et al. ...... 137/821 |
| 3,529,612 | A |   | 9/1970  | Rausch               |

(Continued)

FOREIGN PATENT DOCUMENTS

| EP | 1506911 | 2/2005 |
| EP | 1544089 | 6/2005 |

(Continued)

OTHER PUBLICATIONS

Communication Under Rule 71(3) EPC Dated Dec. 23, 2011 From the European Patent Office Re. Application No. 08738243.8.

(Continued)

*Primary Examiner* — Craig Schneider

(57) ABSTRACT

A method of causing a fluid flow to oscillate between two exit directions. The method comprises causing a primary flow of fluid through a conduit, the conduit characterized by two exit directions and providing first and second oscillation control ports, the first and second oscillation control ports transverse to the conduit and connected to one another by a feedback tube.

17 Claims, 7 Drawing Sheets

(56) References Cited

U.S. PATENT DOCUMENTS

| | | | |
|---|---|---|---|
| 3,552,415 A | 1/1971 | Small | |
| 3,580,265 A | 5/1971 | Horacek | |
| 3,807,662 A | 4/1974 | Velazquez | |
| 3,868,322 A | 2/1975 | Orloff | |
| 3,901,277 A | 8/1975 | Viets | |
| 3,942,559 A | 3/1976 | Kranz et al. | |
| 4,231,519 A * | 11/1980 | Bauer | 239/589.1 |
| 4,291,395 A * | 9/1981 | Holmes | 367/83 |
| 5,129,585 A * | 7/1992 | Bauer | 239/589.1 |
| 5,374,013 A | 12/1994 | Bassett et al. | |
| 5,524,660 A | 6/1996 | Dugan | |
| 5,863,090 A | 1/1999 | Englar | |
| 5,893,383 A | 4/1999 | Facteau | |
| 2006/0048829 A1 | 3/2006 | Seifert et al. | |
| 2010/0194142 A1 | 8/2010 | Seifert et al. | |

FOREIGN PATENT DOCUMENTS

| | | |
|---|---|---|
| FR | 916198 | 11/1946 |
| FR | 2890637 | 3/2007 |
| GB | 1235222 | 6/1971 |
| WO | WO 90/05084 | 5/1990 |
| WO | WO 2006/080873 | 8/2006 |
| WO | WO 2008/135967 | 11/2008 |
| WO | WO 2008/135968 | 11/2008 |

OTHER PUBLICATIONS

Response Dated Feb. 17, 2011 Official Action of Jan. 18, 2011 From the US Patent and Trademark Office U.S. Appl. No. 12/598,441.
Official Action Dated May 3, 2011 From the US Patent and Trademark Office U.S. Appl. No. 12/598,441.
Official Action Dated Jan. 12, 2012 From the US Patent and Trademark Office U.S. Appl. No. 12/598,441.
Official Action Dated Jan. 18, 2011 From the US Patent and Trademark Office U.S. Appl. No. 12/598,441.
Communication Pursuant to Article 94(3) EPC Dated Nov. 15, 2011 From the European Patent Office Re. Application No. 08738244.6.
2nd Written Opinion Dated May 13, 2009 From the International Preliminary Examining Authority Re.: Application No. PCT/IL2008/000541.
2nd Written Opinion Dated May 13, 2009 From the International Preliminary Examining Authority Re.: Application No. PCT/IL2008/000542.
International Preliminary Report on Patentability Dated Jul. 24, 2009 From the International Preliminary Examining Authority Re.: Application No. PCT/IL2008/000541.
International Preliminary Report on Patentability Dated Jul. 24, 2009 From the International Preliminary Examining Authority Re.: Application No. PCT/IL2008/000542.
International Search Report Dated Sep. 4, 2008 From the International Search Report Re.: Application No. PCT/IL2008/000541.
International Search Report Dated Sep. 4, 2008 From the International Searching Authority Re.: Application No. PCT/IL2008/000542.
Written Opinion Dated Sep. 4, 2008 From the International Searching Authority Re.: Application No. PCT/IL2008/000541.
Written Opinion Dated Sep. 4, 2008 From the International Searching Authority Re.: Application No. PCT/IL2008/000542.
2nd International Preliminary Report on Patentability Dated Dec. 17, 2009 From the International Preliminary Examining Authority Re.: Application No. PCT/IL2008/000541.
Official Action Dated Jun. 26, 2012 From the US Patent and Trademark Office U.S. Appl. No. 12/598,441.
Official Action Dated Dec. 11, 2012 From the US Patent and Trademark Office U.S. Appl. No. 12/598,441.
Official Action Dated Jul. 12, 2013 From the US Patent and Trademark Office Re. U.S. Appl. No. 12/598,441.

* cited by examiner

APPARATUS AND METHOD FOR OSCILLATING FLUID JETS

RELATED APPLICATIONS

This Application is a National Phase of PCT Patent Application No. PCT/IL2008/000541 having International filing date of Apr. 27, 2008, which claims the benefit of U.S. Provisional Patent Application Nos. 60/924,157 and 60/924,158 both filed on May 2, 2007 and is related to co-pending application entitled "Methods and apparatus for reduction of aerodynamic drag" by G. Arwatz, I. Fono and A. Seifert identified as Ser. No. 12/598,441 and filed as a PCT Patent Application the same day as the instant application. The disclosures of all of the above mentioned applications are fully incorporated herein by reference.

FIELD OF THE INVENTION

The present invention relates to oscillating fluid jets, methods of production thereof and apparatus for producing same.

BACKGROUND OF THE INVENTION

Flow control technology relates generally to the capability to alter flow properties relative to their natural tendencies by introduction of a constant, or periodic, excitation. Use of a periodic excitation for control of boundary layer separation has been demonstrated to be both possible and efficient in incompressible flows (Seifert et al. (1996) "Delay of Airfoil Stall by Periodic Excitation", J of Aircraft. Vol. 33, No. 4, pp. 691 699 and Seifert et al. (1999) "Oscillatory Control of Separation at High Reynolds Numbers", AIAA J. 37(9): 1062-1071) especially at low speeds and in a wide range of Reynolds numbers (Re; $10^{0.4}$ to $10^7$). Control of boundary layer separation in compressible flows has also been demonstrated, although the level of oscillation required is higher than that required in in-compressible flows (Seifert et al. (2001) "Oscillatory Control of Shock-induced Separation", (AIAA paper 99 0925), J. Aircraft, 38(3): 464 472 and Seifert et al. (2003) "Effects of Compressibility and Excitation Slot Location on Active Separation Control at High Reynolds Numbers", J. Aircraft 40 (1): pp. 110-119). Despite this, as long as the flow is free of shock waves, there is no theoretical or physical difference resulting from the mere increase of Mach number. One of the primary uses of flow control in boundary layer control is to delay, prevent or manage unwanted boundary layer separation.

Significant scientific and technological effort has been invested in control of boundary layer separation. Alternate methods of flow actuation have been examined including mechanical mixing (e.g. vortex generators, Allan et al (2002) Numerical Simulations of Vortex Generator Vanes and Jets on a Flat Plate, AIAA Paper 2002 3160), pneumatic vortex generator-jets (e.g., steady and oscillatory, Johnston, et al. (2002) International J. of Heat and Fluid Flow, 23(6):750 757; and Khan and Johnston, (2000) International J. of Heat and Fluid Flow, (21(5): 505 511.) and cyclic excitation. Under certain conditions (e.g. at low Re numbers) that cyclic excitation is more efficient than steady excitation for boundary layer control by about two orders of magnitude (Seifert et al (1996) J. of Aircraft 33(4):691-699).

Prandtl defined the boundary layer and the scientific and engineering advantages to be realized its control. Prandtl also defined the basic theoretical problems related to control of boundary layer separation and went on to explain one possible solution to these problems, control of the boundary layer separation by suction, applied upstream of the separation point with suppression of the negative phenomena resulting from the flow detachment from the surface. These phenomena lead to reduction in efficiency of the flow related mechanism. Prandtl demonstrated the efficacy of boundary layer suction by placement of suction ports upstream to the boundary layer separation point in a wide angle diffuser, whose boundary layers separated without control. In the presence of suction, the flow remained attached to the two walls of the diffuser (Prandtl and Teitjens (1934) Applied Hydro and Aerodynamics; Dover, N.Y.; page 294).

Even in a case where suction of the boundary layer prevents separation locally, downstream spreading of flow streamlines can cause boundary layer separation downstream of the point where suction is applied.

U.S. Pat. No. 7,055,541 to Seifert et al. describes methods and mechanisms for Producing Suction and Periodic Excitation Flow including embodiments in which an exit flow direction oscillates of a boundary layer control fluid stream oscillates. The disclosure of this patent is fully incorporated herein by reference.

It is known to employ a converging-diverging inlet nozzle in conjunction with a suction flow. In an apparatus with a given set of dimensions, a converging-diverging inlet nozzle can function in a variety of ways depending on operational conditions (see FIG. 3; taken from Streeter and Wylie (1981) Fluid Mechanics, 7th Edition; McGraw Hill Ryerson; page 283). FIG. 3 presents converging-diverging nozzle pressure and Mach number characteristics. If the flow at the nozzle exit is desired to be supersonic, it is required to have a nozzle pressure-ratio that will ensure ideally expanded jet (below point j, in FIG. 3). A higher pressure ratio will cause a shock wave right downstream of the nozzle exit and the flow will return to subsonic conditions. When wholly subsonic operation is desired and efficiency is a prime consideration, a short converging inlet nozzle suffices.

SUMMARY OF THE INVENTION

An aspect of some embodiments of the present invention relates to oscillation control ports connected by a feedback tube. In an exemplary embodiment of the invention, the ports are provided transverse to a wall of a conduit through which a fluid flow is directed. Optionally, the fluid flow oscillates automatically between two or more exit directions as a result of flowing past the oscillation control ports.

In an exemplary embodiment of the invention, a primary flow of fluid through the conduit past one of the oscillation control ports causes a negative control pressure in one of the oscillation control ports which propagates through the feedback tube and causes a positive control pressure at the other control port. The positive control pressure diverts the fluid flow towards the other control port. Iterative repetition of this process causes the flow to oscillate. Optionally, the conduit is characterized by two or more defined exit directions and oscillation is between the defined exit directions.

Optionally, the primary flow is amplified by allowing additional fluid to join the primary flow through one or more suction ports in fluid communication with the conduit upstream of the oscillation control ports.

According to various exemplary embodiments of the invention, oscillation frequency is determined by one or more of a flow rate through the conduit, a dimension of the feedback tube and a dimension of the conduit.

In an exemplary embodiment of the invention, a fluid flow through a conduit characterized by two exit directions passes oscillation control ports transverse to a wall of the conduit and connected to one another by a feedback tube. Optionally, the feedback tube is adapted to control oscillation. Optionally, the fluid flow is directed towards a first exit direction and creates a negative pressure at a first oscillation control port. Optionally, Bernoulli's principle contributes to creation of the negative pressure.

The negative pressure produces a secondary flow towards a first oscillation control port in the feedback tube. In an exemplary embodiment of the invention, the secondary flow in the feedback tube causes a positive pressure in a second oscillation control port. Optionally, the positive pressure in the second oscillation control port the fluid flow to shift to a second exit direction.

Once the fluid flow is in the second exit direction, it creates a negative pressure at the second oscillation control port and a direction of secondary flow in the feedback tube is reversed. In an exemplary embodiment of the invention, this process is iteratively repeated and results in an oscillation of the primary flow between the exit directions. Optionally, a frequency of the oscillation can be controlled by altering one or more dimensions of the feedback tube and/or the oscillation control ports and/or the conduit during design. Alternatively, or additionally, a rate of the fluid flow contributes to oscillation frequency.

In an exemplary embodiment of the invention, feedback control is dynamic. Optionally, two or more feedback tubes are provided, with switches to put one or more into/out of play Optionally, oscillation can be interrupted or prevented by blocking a flow through the feedback tube.

In an exemplary embodiment of the invention, the apparatus is incorporated into a system with a controller. Optionally, the controller includes one or more of a flow regulator, a switching mechanism and a dimension changer.

In an exemplary embodiment of the invention, there is provided a method of causing a fluid flow to oscillate between two exit directions, the method comprising:
(a) causing a primary flow of fluid through a conduit, the conduit characterized by two exit directions; and
(b) providing first and second oscillation control ports, said first and second oscillation control ports transverse to said conduit and connected to one another by a feedback tube.

Optionally, the method comprises,
(c) amplifying the primary flow by allowing additional fluid to join said flow through at least one suction port in fluid communication with said conduit upstream of the oscillation control ports to create an amplified flow.

Optionally, the method comprises, varying a frequency of oscillation by altering a length of the feedback tube.

Optionally, the method comprises, interrupting oscillation by preventing a secondary flow through the feedback tube.

Optionally, the method comprises, varying a frequency of oscillation by altering a rate of the primary flow.

Optionally, the method comprises, regulating a frequency of oscillation by controlling a diameter of the feedback tube.

Optionally, the method comprises, regulating a frequency of oscillation by controlling a volume of the feedback tube.

Optionally, the method comprises, regulating a frequency of oscillation by controlling a conduit dimension.

Optionally, the method comprises, regulating a frequency of oscillation by controlling a control port dimension.

Optionally, the causing comprises directing the primary flow through a converging diverging nozzle.

In an exemplary embodiment of the invention, there is provided an automatic mechanism to produce a fluid jet with an oscillating exit direction, the mechanism comprising:
(a) a conduit adapted to convey a flow of fluid, the conduit characterized by two exit directions; and
(b) a feedback control tube terminating in first and second oscillation control ports, said first and second oscillation control ports transverse to a wall of said conduit and connected to one another by the feedback tube.

Optionally, the apparatus comprises, a jet port adapted to direct the flow into the conduit at a controlled input pressure.

Optionally, the jet port comprises a converging-diverging nozzle.

Optionally, the apparatus comprises, at least one suction port in fluid communication with said conduit and an environment external to the mechanism, said at least one suction slot capable of allowing additional fluid to join said flow to create an amplified flow.

Optionally, the apparatus is adapted for automatic oscillation based solely on energy from the flow.

Optionally, the apparatus comprises an oscillation regulation mechanism.

Optionally, the oscillation regulation mechanism is adapted to vary a frequency of oscillation by altering a volume of the feedback tube.

Optionally, the oscillation regulation mechanism is adapted to vary a flow of fluid through the conduit.

Optionally, the apparatus comprises, an oscillation interruption mechanism adapted to prevent a control pressure through the feedback tube.

Optionally, the interruption mechanism seals the tube.

BRIEF DESCRIPTION OF THE DRAWINGS

Exemplary non-limiting embodiments of the invention described in the following description, read with reference to the figures attached hereto. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DETAILED DESCRIPTION OF EXEMPLARY EMBODIMENTS

Overview

The invention relates generally to oscillating fluid jets, methods of production thereof and apparatus for producing same. In an exemplary embodiment of the invention, oscillation is automatic. Optionally, an oscillation frequency can be controlled by altering an inlet flow rate, amplified flow rate and/or apparatus dimensions. In an exemplary embodiment of the invention, flow rate is amplified by means of suction ports which draw additional fluid into the system. In an exemplary embodiment of the invention, the additional fluid mixes with an inlet flow to create an amplified flow. Exemplary embodiments of the invention share, as a common feature, a pressure operated oscillation control mechanism. In an exemplary embodiment of the invention, the oscillation control mechanism comprises two oscillation control ports connected by a feedback tube.

Figure 1:
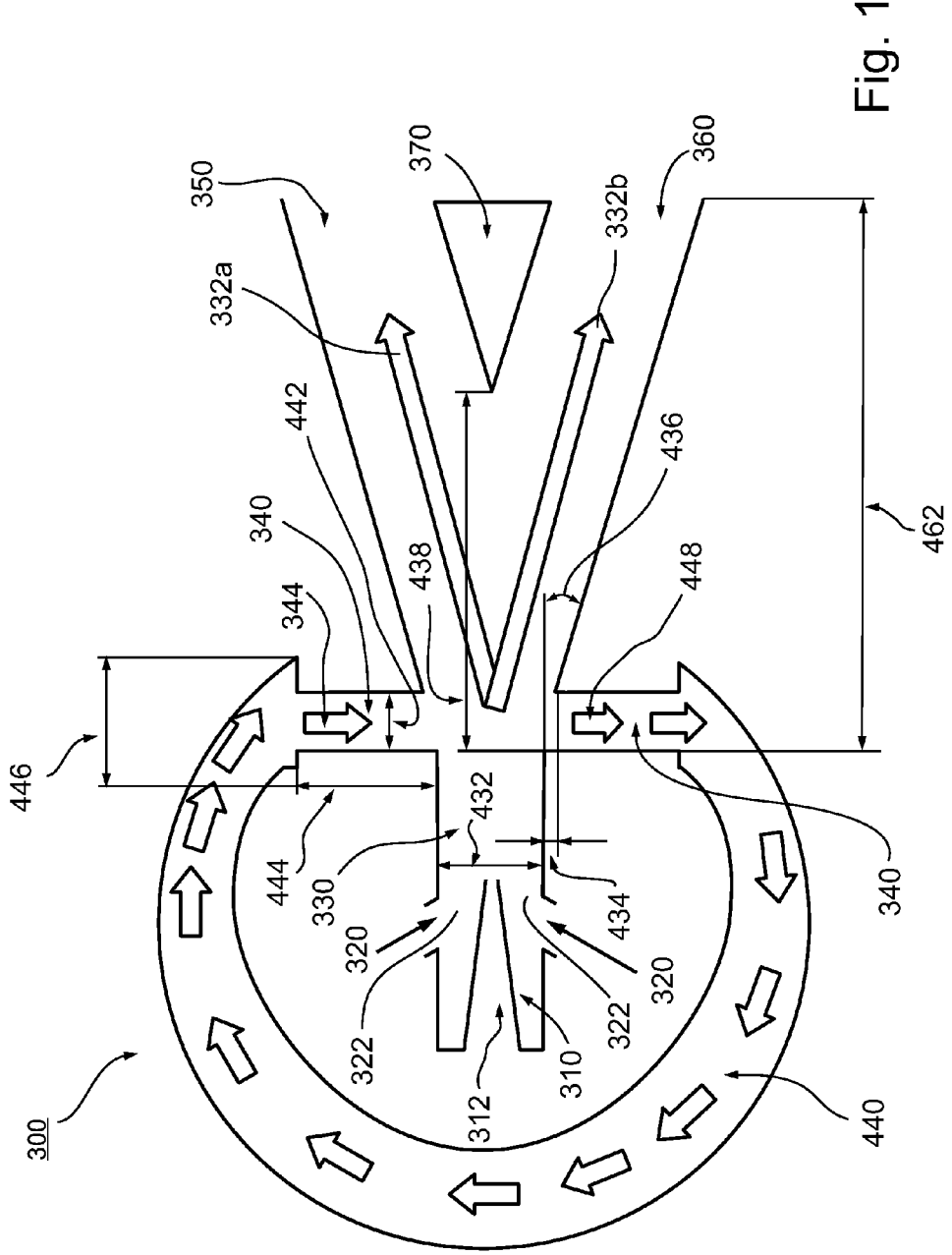
FIG. 1 is a schematic representation of an apparatus according to an exemplary embodiment of the invention illustrating connection of control ports by a feedback tube according to an exemplary embodiment of the invention.
Figure 2:
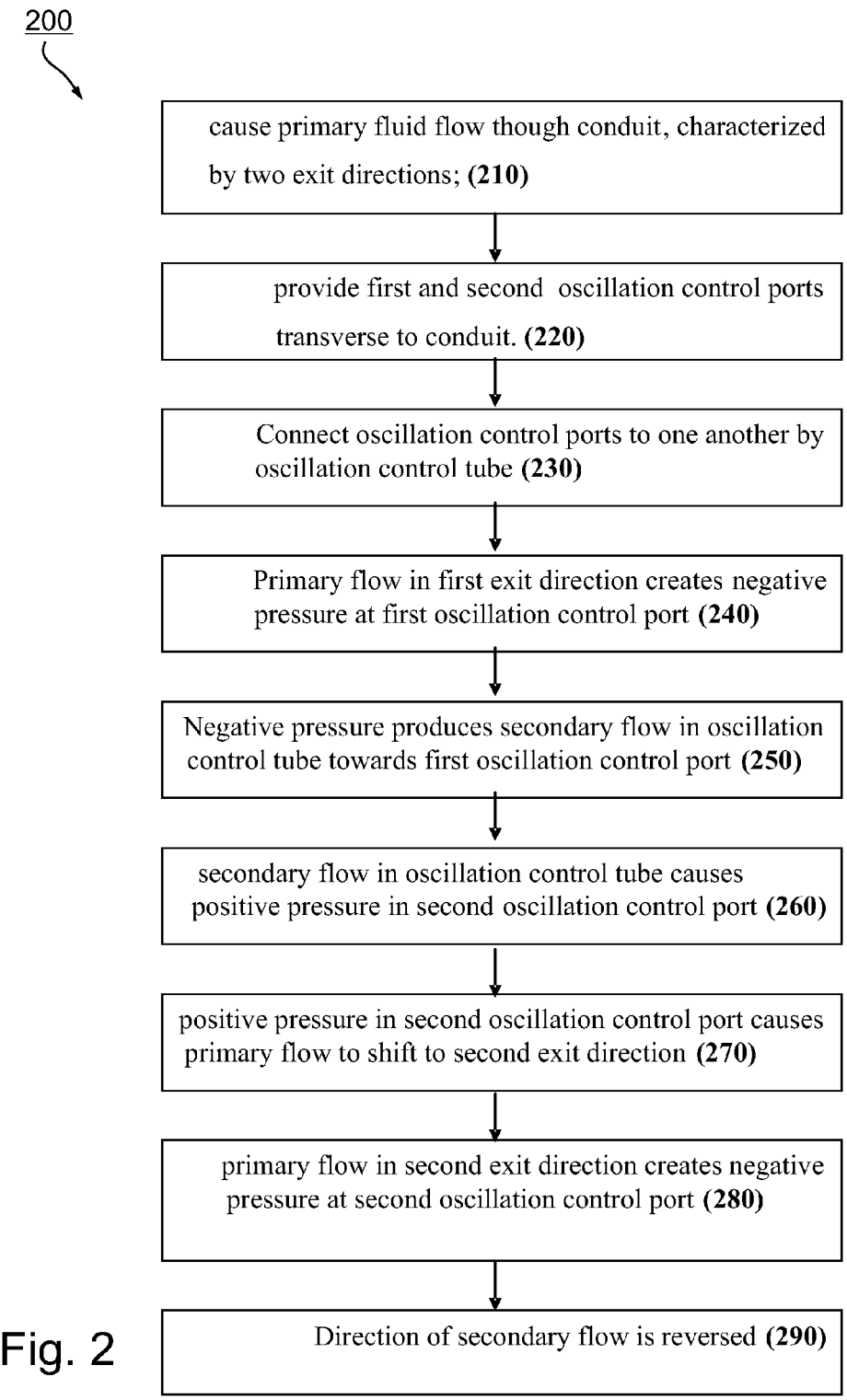
FIG. 2 is a simplified flow diagram of a method according to an exemplary embodiment of the invention.
Figure 6:
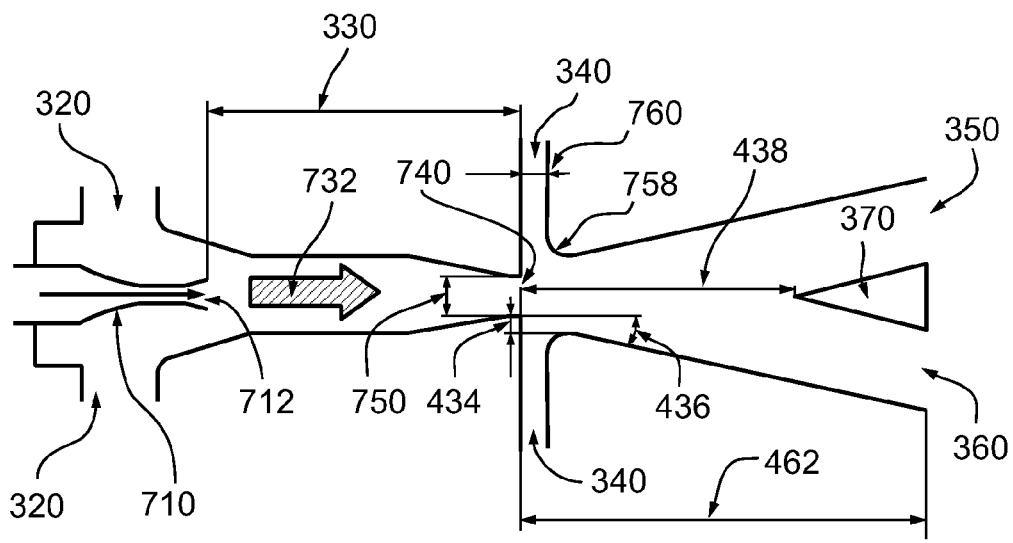
FIG. 6 is a schematic representation of an apparatus according to an exemplary embodiment of the invention featuring an exemplary converging-diverging nozzle as an inlet port.

FIG. 2 is a simplified flow diagram of an exemplary method 200 of causing a fluid flow in a conduit to oscillate between two exit directions according to an embodiment of the invention. FIGS. 1 and 6 illustrate exemplary apparatus adapted to cause a fluid flow in a conduit to oscillate between two exit directions according to various embodiments of the invention.

Exemplary Method

Referring now concurrently to FIGS. 1 and 2: at 210 (FIG. 2) an injection port 310 (FIG. 1) causes a primary fluid flow 332 through a conduit 330 characterized by two exit directions 350 and 360.

In order to induce oscillation, oscillation control ports 340 are provided (220) transverse to a wall of conduit 330. In an exemplary embodiment of the invention, oscillation control ports 340 are connected (230) to one another by a feedback tube 440 adapted to control oscillation.

In an exemplary embodiment of the invention, primary flow 332a is directed towards a first exit direction 350. Optionally, flow through the conduit is bi-stable so that either 332a or 332b can occur, but a neutral state in which 332a and 332b occur together is unstable. Flow 332a creates (240) a negative pressure 344 (i.e. out of port 340) at a first (upper in this view) oscillation control port 340. Optionally, Bernoulli's principle contributes to creation of negative pressure 344.

Negative pressure 344 produces (250) a secondary flow in a feedback tube 440 (FIG. 1) towards first oscillation control port 340. In an exemplary embodiment of the invention, the secondary flow (indicated as a series of hollow arrows in FIG. 1) in the feedback tube causes (260) a positive pressure 448 in a second (bottom in FIG. 1) oscillation control port 340.

In an exemplary embodiment of the invention, positive pressure 448 (i.e. into port 340) in second oscillation control port 340 causes primary flow 332a to shift (270) to a second exit direction 360 (332b).

Now that primary flow 332b is in second exit direction 360, it creates (280) a negative pressure, optionally a stronger negative pressure, at the second oscillation control port and a direction of secondary flow (or pressure transmission) is reversed (290).

In an exemplary embodiment of the invention, this process is iteratively repeated and results in an oscillation of the primary flow between exit directions 350 and 360.

Exemplary Apparatus

FIG. 1 is a schematic representation of an exemplary oscillating flow apparatus 300 according to one embodiment of the invention in lateral cross section. The feedback tube is removed for clarity.

In the depicted embodiment, an initial flow 312 enters an inner lumen of conduit 330 via a primary injection port 310. Optionally, port 310 includes a regulation mechanism adapted to vary a rate of initial flow 312. In an exemplary embodiment of the invention, varying initial flow 312 contributes to a change in an oscillation frequency. In the depicted exemplary embodiment, area 432 of conduit 330 is adapted to mix flows 322 and 312.

Optionally, initial flow 312 is supplemented by one or more suction flows 322 recruited via one or more suction ports 320 (two suction ports 320 are depicted, but any number is possible as long as symmetry is preserved). Optionally, ports 320 include a regulation mechanism adapted to vary a rate of suction flows 322. In an exemplary embodiment of the invention, varying suction flows 322 contributes to a change in an oscillation frequency. Suction ports 320 can optionally be configured as slots.

In an exemplary embodiment of the invention, initial flow 312 results from an energy input into the system. Optionally, suction flows 322 are passively drawn into conduit 330 by flow 312 exiting injection port 310 according to Bernoulli's principle and entrainment process due to mixing between energetic flow 312 and entrained flows 322. Suction flows 322 mix with initial flow 312 to produce an amplified flow 332(*a* or *b*). In an exemplary embodiment of the invention, amplified flow 332 is characterized by a flow rate representing a sum of flow rates of initial flow 312 and all suction flows 322. Optionally, suction flows 322 bring additional fluid into the system (e.g. from a boundary layer flowing past suction ports 320). In an exemplary embodiment of the invention, conduit 330 is sufficiently long to insure thorough mixing of initial flow 312 and suction flow(s) 322 before amplified flow 332 reaches oscillation control ports 340.

In the depicted embodiment, amplified flow 332a proceeds through conduit 330 and is deflected by a splitter 370 towards exit direction 350. As amplified flow 332a passes oscillation control ports 340, flow 332a is closer to upper oscillation port 340 as in proceeds towards exit direction 350, as opposed to exit direction 360. In the depicted embodiment, exit directions 350 and 360 are separated by a splitter 370.

Proximity of amplified flow 332a to upper oscillation port 340 causes a negative pressure 344 in upper oscillation control port 340, due to flow 332 turning around the corner. The transmitted negative pressure 344 causes a series of cyclic oscillations of amplified flow 332 between exit directions 350 and 360 as described below with reference to FIG. 1.

As described above negative pressure 344 in upper control port 340 results from passage and turning of flow 332a across upper port 340 and into exit port 350.

As depicted in FIG. 1, the negative pressure 344 creates a negative traveling pressure pulse (traveling opposite the arrows in oscillation feedback tube 440) which produces a positive flow 448 in lower oscillation control port 340.

In an exemplary embodiment of the invention, the transmitted negative pressure pulse (or alternatively the positive flow) 448 deflects primary flow 332a from exit direction 350 to exit direction 360 where it is depicted as primary flow 332b.

At this point, pressures in flow control ports 340 and the pressure sign in feedback control tube 440 are inverted.

In an exemplary embodiment of the invention, primary flow 332 oscillates between an "a" state in which it flows towards exit direction 350 and a "b" state in which it flows towards exit direction 360. Optionally, an oscillation frequency (f) can vary with one or more of an offset distance 434 between a distal end of conduit 330 and a proximal end of an angled exit port (e.g. 350 or 360), a wall angle 436 of the angled exit port, a splitter distance 438 (between a distal end of conduit 330 and a proximal end of the splitter 370), a diameter 442 of oscillation port 340, a height 444 of oscillation port 340, a hydraulic diameter 446 of oscillation feedback tube 440 and a length 462 of an exit port (i.e. linear distance from distal end of conduit 330 to egress from exit port (e.g. 360) without regard to angle). In an exemplary embodiment of the invention, as the wall angle 436 increases, a control pressure 344 and/or 448 at which oscillation begins also increases.

Exemplary Oscillation Rate Control

Figure 4A:
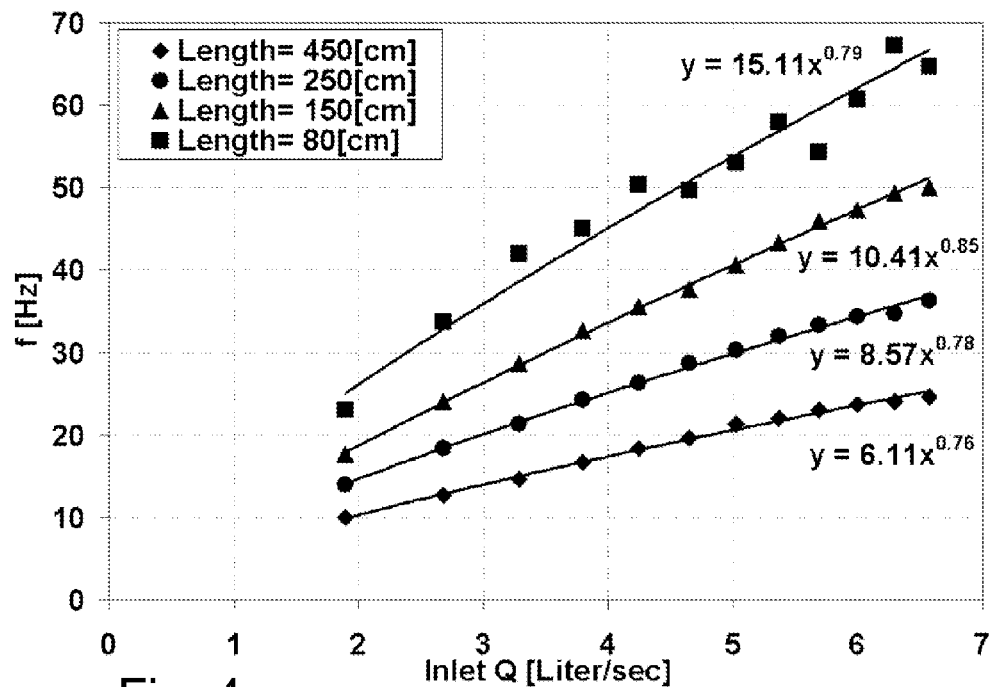
FIG. 4a is a graph of oscillation frequency (Hz) as a function of inlet flow rate (Liters/sec) according to various exemplary embodiments of the invention.
Figure 4B:
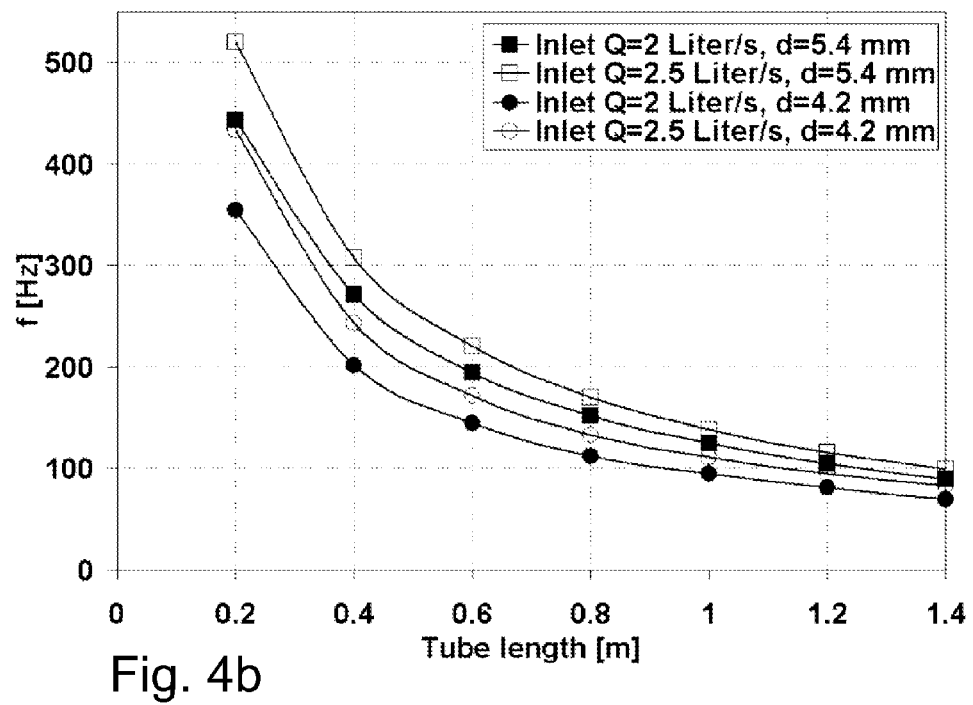
FIG. 4b is a graph of oscillation frequency (Hz) as a function of feedback tube length (M) according to various exemplary embodiments of the invention.

FIGS. 4a and 4b are graphs illustrating exemplary characteristics of self-oscillating fluid flow apparatus according to some exemplary embodiments of the invention.

In FIG. 4a oscillation frequency (f in Hz) is plotted as a function of inlet flow rate (Q in Liters/sec). Data presented graphically in FIG. 4a reflects experiments done with feedback tubes 440 having lengths of 80, 150, 250 and 450 cm and Q from 0 to 7 L/s. For a given tube length, f increases as Q increases. For a given Q, a shorter feedback tube 440 produces a greater oscillation frequency (f). The effect of feedback tube 440 length on f becomes greater as Q increases.

In FIG. 4b oscillation frequency (f in Hz) is plotted as a function of feedback tube 440 length in meters. Experiments were conducted with Q of 2 and 2.5 liters and oscillation tubes 440 with inner diameters 446 of 4.2 and 5.4 mm. Results summarized graphically in FIG. 4b indicate that for a given tube length and Q, f increases as tube diameter 446 increases. Data presented in FIG. 4b confirms again that f increases as Q increases and/or that f increases as tube length decreases.

In summary, FIGS. 4a and 4b indicate that as the dimensions of feedback tube 440 decrease, the oscillation frequency (f) increases. In an exemplary embodiment of the invention, it is a volume of tube 440 which contributes to a change in f, although only diameter and length were experimentally tested. Optionally, a volume of control ports 340 also influences f. However, in practice, the combined volume of ports 340 is typically much smaller than a volume of tube 440. Optionally, a control port 340 with a very small diameter 760 could negatively influence f even if tube 440 were characterized by a large volume. In practice varying a dimension and/or volume of tube 440 and/or ports 340 is usually done in design or construction of the apparatus. However, apparatus with mechanisms adapted for varying a dimension and/or volume of tube 440 and/or ports 340 after construction (e.g. during use) are within the scope of the invention.

In an exemplary embodiment of the invention, a single apparatus is adapted to provide two or more different oscillation frequencies. Optionally, all other geometry details and flow conditions remain fixed. Optionally, two or more feedback tubes 440 of different lengths are connected in parallel between control ports 340. According to this exemplary embodiment of the invention, oscillation frequency (f) is determined by all unblocked feedback tubes 440 and their respective dimensions and/or volumes.

In an exemplary embodiment of the invention, blocking one or more of the tubes changes f. Optionally, this strategy is used to permit single apparatus to oscillate at a plurality of frequencies (f). In an exemplary embodiment of the invention, a desired range of frequencies is provided by constructing an apparatus with a suitable number of oscillation feedback tubes 440, each tube with characteristics to impart a desired frequency. Alternatively, or additionally, variations in the frequency can be achieved by adjusting flow rate (Q). However, adjustment of Q also influences the magnitude flow 332 exiting exits 350 and/or 360.

Figure 5:
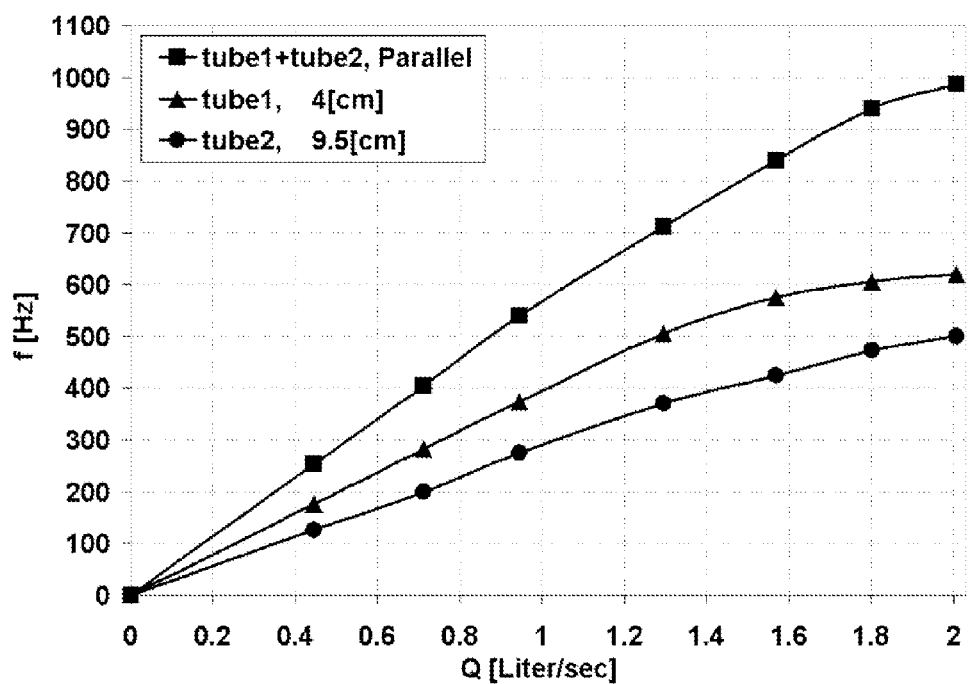
FIG. 5 is a graph of oscillation frequency (Hz) as a function of inlet flow rate (Liters/sec) according to various exemplary embodiments of the invention.

FIG. 5 summarizes graphically results of an experiment performed using an apparatus with two feedback tubes 440. One feedback tube 440 had a length of 4 cm and the second oscillation tube 440 had a length of 9.5 cm. FIG. 5 is a plot of oscillation frequency (f in Hz) as a function of a rate of inlet flow 312 (Q in Liters/sec) using the 4 cm tube (triangles), the 9.5 cm tube (circles) or the two tubes together in parallel (squares). Tubes not in use were only sealed at their center during the experiment but not removed. Data presented in FIG. 5 suggest that when two feedback tubes 440 are employed together, f is greater than when either tube is used individually, but that the f is less than a sum of the frequencies resulting from each tube individually.

In an exemplary embodiment of the invention, one or more factors selected from inlet pressure, inlet flow-rate (Q) and output velocity contribute to oscillation frequency (f) during actuator operation.

Since oscillation control pressures 344 and 448 are sensitive to back-pressure through exits 350 and/or 360, an area ratio between inlet nozzle 310 and conduit 330 at control port 340 (740) influences at which working conditions oscillation will occur as explained below.

Exemplary Inlet Port Configuration

Figure 3:
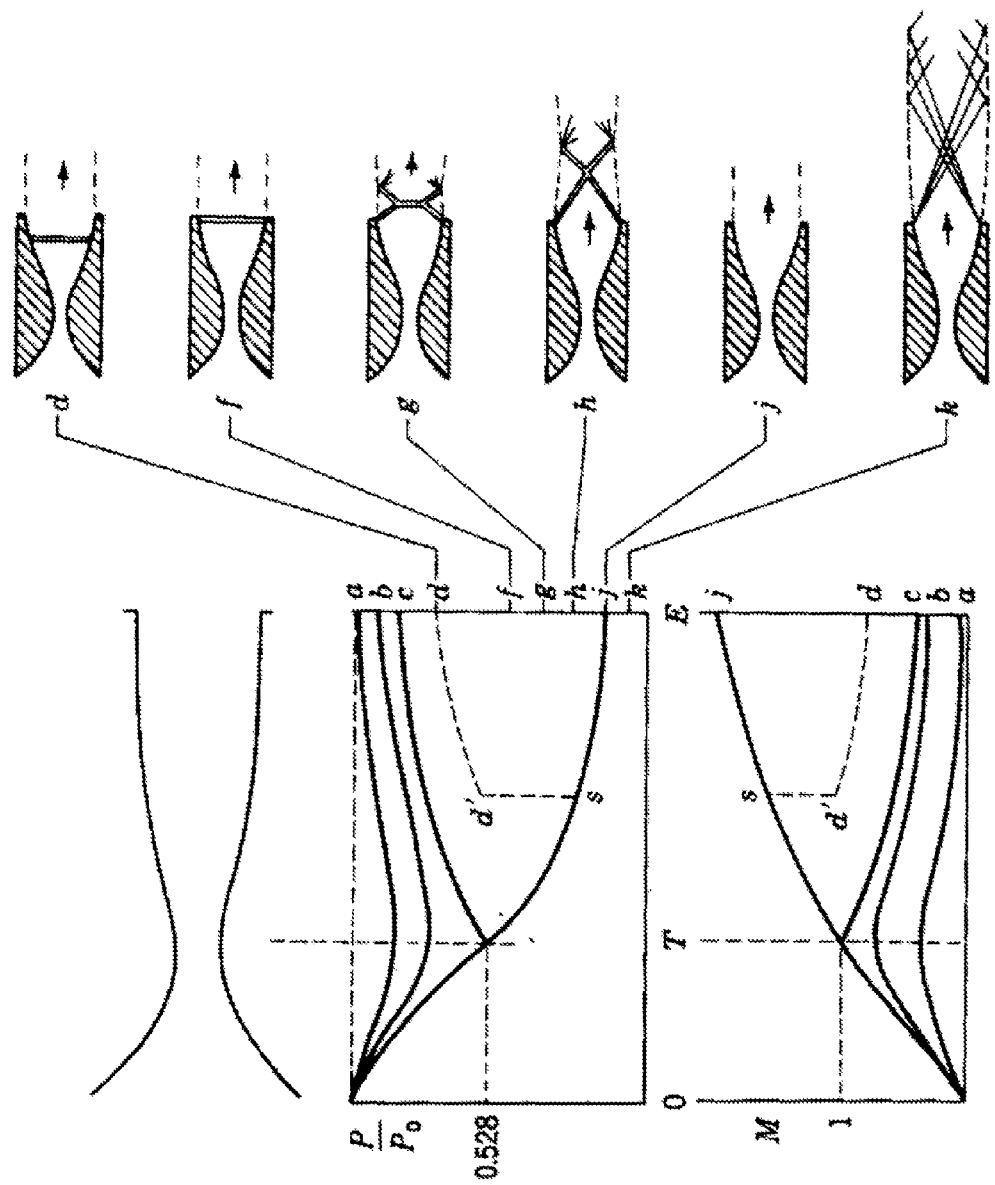
FIG. 3 (prior art) illustrates various pressure and Mach number configurations of flow through a converging-diverging nozzle.

FIG. 6 depicts an exemplary apparatus 700 in lateral cross section. Apparatus 700 includes a converging-diverging inlet nozzle 710 with a cross sectional area at exit 712 of inlet nozzle 710. Optionally, nozzle 710 is adapted to produce an exit flow 732 as depicted in panel j of FIG. 3.

In an exemplary embodiment of the invention, a small cross-sectional exit area at exit 712 of inlet nozzle 710 can result in a high entrainment ratio of additional flow via suction ports 320 but also produces a high pressure-loss.

Conversely a large cross sectional exit area 712 can result in a high output velocity (e.g. 332a or 332b) for a lower inlet pressure but can produce a low entrainment ratio. In order to achieve a desired apparatus performance an area ratio should be carefully considered. It has been experimentally determined that an area ratio defined as $\lambda = A_4$ (at 740)/$A_1$ (at 712) in the range 3 to 15 encourage oscillation while $\lambda$ outside this range can discourage oscillation. In an exemplary embodiment of the invention, $A_4$ (740) can be used as a primary engineering constraint in designing an apparatus of a desired size.

Since parameters of the entire apparatus can be defined relative to a width 750 of the valve inlet duct 740, width 760 is typically held constant. In order to change the switching valve inlet nozzle area without changing the nozzle width it is possible to change the inlet aspect ratio (depth ratio) $\sigma = h/b$ (where h is the actuator depth (into the page in FIG. 6) and b is width 750 of conduit 330 at a junction with oscillation control ports 340. In an exemplary embodiment of the invention, oscillation occurs when the aspect-ratio $\sigma$ is between 1.5 and 10. A $\sigma$ outside this range may serve to discourage oscillation.

In the depicted exemplary lateral cross section of FIG. 6, oscillation control ports 340 are not bilaterally symmetric with respect to their vertical axis. Each of ports 340 terminates farther from a line extending from injection port nozzle 712 to an apex of splitter 370 on its right side than on its left side. In the depicted embodiment, this termination is in a curve characterized by a corner radius 758. Termination in a sharp angle can cause undesired local flow separation. In an exemplary embodiment of the invention, the corner radius r 758 is greater than 1.5*b (750), and the splitter distance 438 is between 6*b and 10*b. As splitter distance 438 decreases, oscillation tends to begin at higher control pressures 344 and 448.

Exemplary Multi-Dimensional Oscillation

FIG. 6 depicts two oscillation control ports extending vertically in a Y direction as a means of causing flow 732 to oscillate between exits 350 and 360 which are vertically displaced from one another and angularly divergent.

In an exemplary embodiment of the invention, an additional pair of oscillation ports (not pictured), extend into and out of the page in a Z direction. In an exemplary embodiment of the invention, these additional oscillation ports are connected by an additional oscillation control tube (not pictured for clarity). According to this additional exemplary embodiment, an additional pair of exits (not pictured for clarity), extend into and out of the page in a Z direction with a similar angular relationship as exits 350 and 360 have in the Y direction. According to this exemplary multi-dimensional oscillation embodiment, flow 732 passing the four oscillation control ports will cause oscillation in the Y direction between exits 350 and 360 as described above, and also cause oscillation in the Z direction between the two additional exits. In an exemplary embodiment of the invention, the Y and Z oscillations are out of phase so that flow 732 is cyclically directed to the 4 exits. Optionally, the control ports and feedback tubes and exits in the Y and Z planes are characterized by similar dimensions.

In an exemplary embodiment of the invention, 3 or 4 or more sets of oscillation control ports and feedback tubes are provided in different planes around an axis of conduit 330.

Exemplary System

Figure 7:
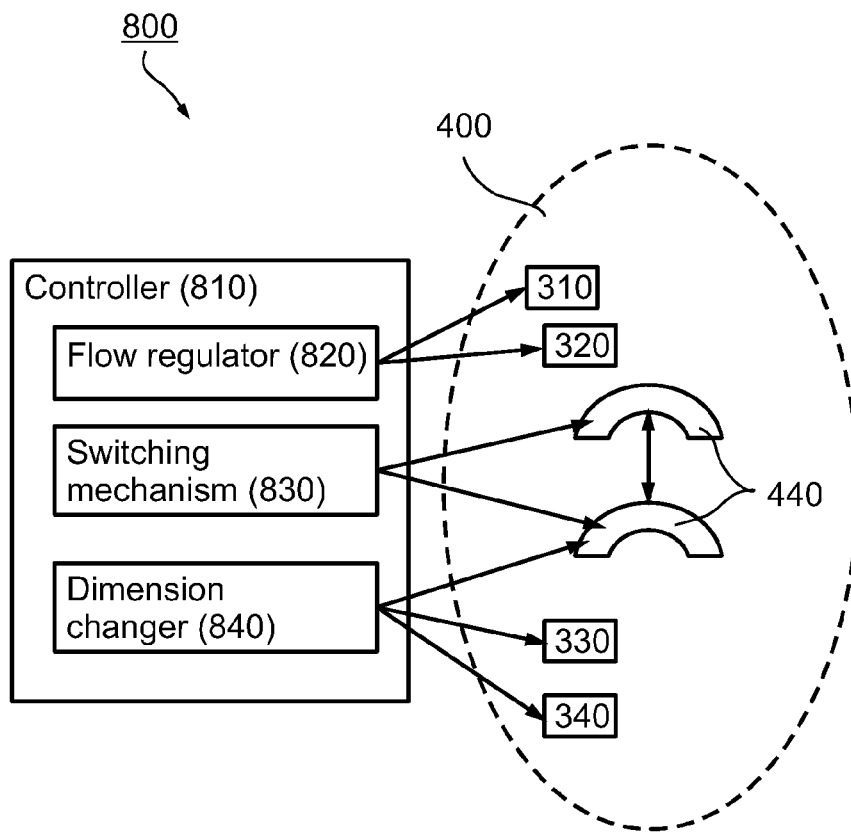
FIG. 7 is a schematic representation of an exemplary system including an apparatus according to an exemplary embodiment of the invention and an exemplary controller.

FIG. 7 illustrates schematically an exemplary system 800 including an exemplary controller 810 and an exemplary apparatus 400 (depicted schematically as a dashed oval) of the general type described in detail above. The depicted controller 810 includes one or more of a flow regulator 820, a switching mechanism 830 and a dimension changer 840.

In an exemplary embodiment of the invention, flow regulator 820 regulates a flow rate through jet port 310 and/or suction ports 320. As described above in relation to FIG. 4a, increased flow rate contributes to increased oscillation frequency.

In an exemplary embodiment of the invention, switching mechanism 830 opens and/or closes two or more feedback tubes 440. As described above in relation to FIG. 5, increased total volume of open feedback tubes 440 contributes to increased oscillation frequency.

In an exemplary embodiment of the invention, dimension changer 840 alters one or more dimensions of feedback tube 440 and/or conduit 330 and/or control ports 340. FIG. 5b illustrates, for example, that increasing length of feedback tube 440 contributes to decreased oscillation frequency. Optionally, tube length is altered by slide valves (e.g. as employed in a trombone) or diversion valves (e.g. as in a trumpet).

In an exemplary embodiment of the invention, dimension changer 840 alters an effective diameter 446 of feedback tube 440.

Figure 8:
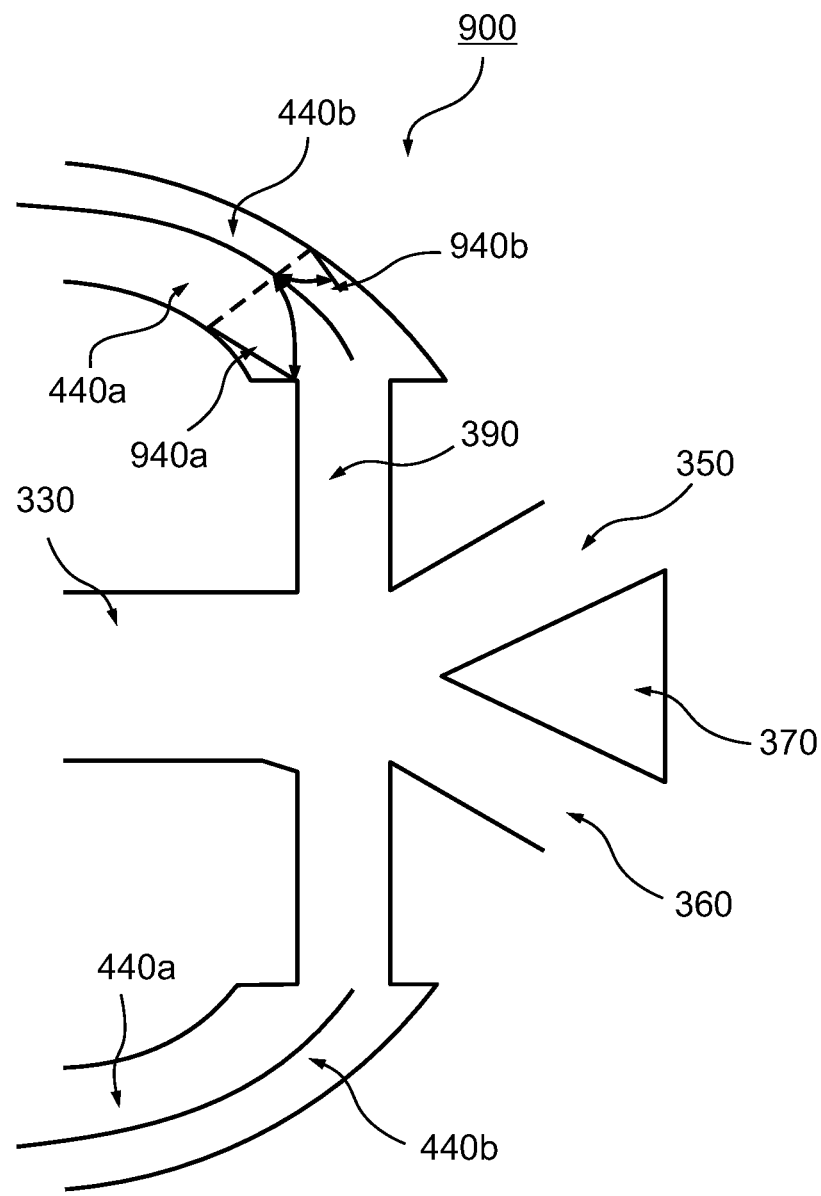
FIG. 8 is a schematic representation of a tube switching mechanism for use in the context of an exemplary embodiment of the invention.

FIG. 8 depicts one exemplary method of altering an effective diameter and/or length of feedback tube 440. In the depicted embodiment 900, control ports 340 are in fluid communication with two feedback tubes 440a (depicted as wide) and 440b (depicted as narrow). In an exemplary embodiment of the invention, valves (shown here as raise-able flaps 940a and 940b) are adapted to selectively close one or more of feedback tubes 440a and 440b. Optionally, valves 940a and 940b are controlled by switching mechanism 830 or are manually controlled. In an exemplary embodiment of the invention, a control flow can be directed via ports 340 into one or both of feedback tubes 440a and 440b so that there are three possible effective diameters: wide, narrow and wide+narrow. Optionally, tubes 440a and 440b are a same or a different length.

In an exemplary embodiment of the invention, concurrent closure of flaps 940a and 940b serves as an oscillation interruption mechanism for the apparatus.

Exemplary Use Scenarios

Various exemplary embodiments of the invention are expected to find utility in delay of boundary layer separation in aerodynamic and hydrodynamic applications. Specific exemplary embodiments are lifting surfaces with high deflection angles (typically known as "high-lift systems", aft bodies of helicopters and transport planes and aft regions in ground transportation systems (e.g. trucks, trailers, SUV's and/or trains).

In an exemplary embodiment of the invention, apparatus and methods described hereinabove are employed to reduce aerodynamic drag.

The present invention has been described using detailed descriptions of embodiments thereof that are provided by way of example and are not intended to necessarily limit the scope of the invention. In particular, numerical values may be higher or lower than ranges of numbers set forth above and still be within the scope of the invention. The described embodiments comprise different features, not all of which are required in all embodiments of the invention. Some embodiments of the invention utilize only some of the features or possible combinations of the features. Alternatively or additionally, portions of the invention described/depicted as a single unit may reside in two or more separate physical entities which act in concert to perform the described/depicted function. Alternatively or additionally, portions of the invention described/depicted as two or more separate physical entities may be integrated into a single physical entity to perform the described/depicted function. Variations of embodiments of the present invention that are described and embodiments of the present invention comprising different combinations of features noted in the described embodiments can be combined in all possible combinations including, but not limited to use of features described in the context of one embodiment in the context of any other embodiment. Specifically, features described in the context of a method can be used to characterize an apparatus and features described in the context of an apparatus can be used to characterize a method. The scope of the invention is limited only by the following claims.

In the description and claims of the present application, each of the verbs "comprise", "include" and "have" as well as any conjugates thereof, are used to indicate that the object or objects of the verb are not necessarily a complete listing of members, components, elements or parts of the subject or subjects of the verb.

All publications and/or patents and/or product descriptions cited in this document are fully incorporated herein by reference to the same extent as if each had been individually incorporated herein by reference.

What is claimed:

1. A method of causing a fluid flow to oscillate between two exit directions, the method comprising:

(a) causing a primary flow of fluid through a conduit, the conduit characterized by two exit directions;

(b) providing first and second oscillation control ports, said first and second oscillation control ports transverse to said conduit and connected to one another by at least one feedback tube; and (c) varying a frequency of oscillation by altering an effective diameter of the at least one feedback tube wherein altering an effective diameter comprises, providing a plurality of feedback tubes configured in parallel and altering the effective diameter by changing the feedback tubes used.

2. A method according to claim 1, wherein changing the feedback tubes being used comprises changing a number of such tubes being used.

3. A method according to claim 1, comprising: varying a frequency of oscillation by altering a length of the feedback tube.

4. A method according to claim 1, comprising: amplifying the primary flow by allowing additional fluid to join said flow through at least one suction port in fluid communication with said conduit upstream of the oscillation control ports to create an amplified flow.

5. A method according to claim 1, comprising:
varying a frequency of oscillation by altering a rate of the primary flow.

6. A method according to claim 1, comprising:
interrupting oscillation by preventing a secondary flow through the feedback tube.

7. A method according to claim 6, wherein the preventing includes sealing the feedback tube.

8. A method of causing a fluid flow to oscillate between two exit directions, the method comprising:
(a) causing a primary flow of fluid though a conduit, the conduit characterized by two exit directions;
(b) providing first and second oscillation control ports, said first and second oscillation control ports transverse to said conduit and connected to one another by a plurality of feedback tubes; and
(c) varying the oscillation frequency by changing which of said plurality of feedback tubes are unblocked.

9. A method according to claim 8 wherein said plurality of tubes have different diameters.

10. A method according to claim 8 wherein said plurality of tubes have different lengths.

11. An automatic mechanism to produce a fluid jet with an oscillating exit direction, the mechanism comprising:
(a) a conduit adapted to convey a flow of fluid, the conduit characterized by two exit directions;
(b) a plurality of feedback control tubes configured in parallel and means for changing the feedback tubes being used, wherein at least one of the plurality of feedback control tubes terminates in first and second oscillation control ports, said first and second oscillation control ports transverse to a wall of said conduit and connected to one another by the at least one feedback tube;
(c) means for altering an oscillation frequency by varying the effective diameter of said plurality of feedback control tubes.

12. A mechanism according to claim 11 wherein changing the feedback tubes being used comprises means for changing a number of such tubes being used.

13. A mechanism according to claim 11 comprising:
a jet port adapted to direct the flow into the conduit at a controlled input pressure.

14. A mechanism according to claim 11, wherein the mechanism comprises a converging-diverging nozzle.

15. A mechanism according to claim 11, comprising:
at least one suction port in fluid communication with said conduit and an environment external to the mechanism, said at least one suction port capable of allowing additional fluid to join said flow to create an amplified flow.

16. A mechanism according to claim 11, adapted for automatic oscillation based solely on energy from the flow.

17. A mechanism according to claim 11, comprising an oscillation interruption mechanism adapted to the feedback tubes.

\* \* \* \* \*